United States Patent
Sweeney et al.

(10) Patent No.: US 9,357,065 B2
(45) Date of Patent: May 31, 2016

(54) SYSTEM, METHOD AND APPARATUS FOR TRANSMITTING AUDIO SIGNALS OVER A VOICE CHANNEL

(75) Inventors: Jeffrey Sweeney, Olathe, KS (US); Kelsyn Rooks, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 754 days.

(21) Appl. No.: 12/406,689

(22) Filed: Mar. 18, 2009

(65) Prior Publication Data

US 2010/0239078 A1    Sep. 23, 2010

(51) Int. Cl.
*H04M 1/64* (2006.01)
*H04M 3/428* (2006.01)
*H04L 29/06* (2006.01)

(52) U.S. Cl.
CPC .......... *H04M 3/4285* (2013.01); *H04L 65/1089* (2013.01)

(58) Field of Classification Search
CPC ............ H04M 2203/205; H04M 3/42; H04M 3/4872; H04L 65/403; H04L 65/4076
USPC .............. 379/88.13, 88.17, 68; 709/218, 219, 709/203
See application file for complete search history.

(56) References Cited

U.S. PATENT DOCUMENTS

| | | | |
|---|---|---|---|
| 6,125,175 A * | 9/2000 | Goldberg | H04M 3/487 379/201.01 |
| 7,400,905 B1 * | 7/2008 | Malkin et al. | 455/556.1 |
| 7,973,818 B2 * | 7/2011 | Agrawal | 348/14.01 |
| 8,051,130 B2 * | 11/2011 | Logan | H04M 3/4872 709/203 |
| 8,229,078 B2 * | 7/2012 | Wright | H04M 3/42 379/201.01 |
| 8,841,986 B2 * | 9/2014 | Holman | 340/4.42 |
| 8,874,645 B2 * | 10/2014 | Espelien | 709/204 |
| 2002/0150081 A1 | 10/2002 | Fang | |
| 2004/0022237 A1 | 2/2004 | Elliott et al. | |
| 2004/0157629 A1 | 8/2004 | Kallio et al. | |
| 2005/0026599 A1 * | 2/2005 | Carter | 455/414.4 |

(Continued)

OTHER PUBLICATIONS

U.S. Appl. No. 11/890,194; Pre-Appeal Decision dated Aug. 13, 2013; 2 pages.

(Continued)

*Primary Examiner* — Van D Huynh
(74) *Attorney, Agent, or Firm* — Swanson & Bratschun, L.L.C.

(57) ABSTRACT

An embodiment of a system for transmitting an audio signal over a voice channel of a voice communication session includes a base station. The base station includes an audio player docking station configured for coupling the base station with an audio player device, and at least one processor. The at least one processor is configured to establish a voice communication session between the base station and a communication device. The voice communication session has a voice channel for carrying voice data between the base station and the communication device. The at least one processor is further configured to receive a user input including a request for an audio signal from the audio player device, and send the audio signal request to the audio player device. The at least one processor is further configured to receive the requested audio signal from the audio player device, and mix the audio signal into the voice channel of the voice communication session.

16 Claims, 7 Drawing Sheets

(56) References Cited

U.S. PATENT DOCUMENTS

| | | | |
|---|---|---|---|
| 2005/0063544 | A1 | 3/2005 | Uusitalo et al. |
| 2005/0174937 | A1 | 8/2005 | Scoggins et al. |
| 2005/0175156 | A1 | 8/2005 | Afshar et al. |
| 2005/0286549 | A1 | 12/2005 | Murphy |
| 2006/0018451 | A1* | 1/2006 | Usuba et al. ............. 379/101.01 |
| 2006/0062366 | A1* | 3/2006 | Tiruthani et al. ........ 379/201.01 |
| 2006/0111910 | A1* | 5/2006 | Nelson .......................... 704/270 |
| 2006/0265397 | A1 | 11/2006 | Bryan et al. |
| 2007/0021145 | A1* | 1/2007 | Lam .................. H04M 1/72563 455/556.1 |
| 2007/0106726 | A1* | 5/2007 | Rosenberg .................... 709/204 |
| 2007/0165629 | A1 | 7/2007 | Chaturvedi et al. |
| 2007/0174469 | A1 | 7/2007 | Andress et al. |
| 2007/0211639 | A1 | 9/2007 | Spalt |
| 2007/0297418 | A1 | 12/2007 | Lee |
| 2008/0031427 | A1* | 2/2008 | Kovales et al. ............ 379/88.13 |
| 2008/0077956 | A1* | 3/2008 | Morrison et al. ................ 725/38 |
| 2008/0134278 | A1* | 6/2008 | Al-Karmi ..................... 725/141 |
| 2008/0200159 | A1* | 8/2008 | Lai ................................ 455/416 |
| 2008/0225848 | A1 | 9/2008 | Pilon |
| 2009/0005892 | A1* | 1/2009 | Guetta et al. .................... 700/94 |
| 2009/0034510 | A1 | 2/2009 | Smoyer et al. |
| 2009/0063645 | A1* | 3/2009 | Casey et al. ................... 709/206 |
| 2009/0251526 | A1* | 10/2009 | Book ........................ 348/14.01 |
| 2009/0257565 | A1* | 10/2009 | Nelson et al. ................... 379/68 |
| 2009/0299735 | A1* | 12/2009 | Bouvet et al. ................. 704/201 |
| 2010/0014693 | A1* | 1/2010 | Park et al. ...................... 381/119 |
| 2010/0046729 | A1* | 2/2010 | Bifano et al. ............ 379/201.12 |
| 2011/0205329 | A1* | 8/2011 | Willis ........................ 348/14.08 |

OTHER PUBLICATIONS

U.S. Appl. No. 11/890,194; Final Rejection dated Mar. 15, 2013; 25 pages.

U.S. Appl. No. 11/890,194; Non-Final Rejection dated Oct. 17, 2012; 25 pages.

Milanovic e al., "Methods for Lawful interception in IP Telephony Networks Based on H.323", EUROCON 2003. Computer as a Tool. The IEEE Region 8, Sep. 22-24, 2003, 5 pages.

Milanovic et al. Distributed System for Lawful Interception in VoIP Networks:, EUROCON 2003. Computer as a Tool. The IEEE Region 8, Sep. 22-24, 2003, 5 pages.

Thanthry et al. "CALEA Compliant Secure Voice Over IP System", Carnahan Conferences Security Technology, Proceedings 2006, 40th Annual IEEE International, Oct. 2006, 6 pages.

U.S. Appl. No. 11/890,194; Final Office Action dated Jan. 31, 2012; 26 pages.

U.S. Appl. No. 11/890,194; Non-Final Rejection dated Jun. 14, 2011; 22 pages.

U.S. Appl. No. 11/890,194; Non-Final Rejection dated Jul. 14, 2014; 26 pages.

U.S. Appl. No. 11/890,194; Final Rejection dated Jan. 15, 2015; 27 pages.

U.S. Appl. No. 11/890,194; Non-Final Rejection dated Jun. 4, 2015; 30 pages.

U.S. Appl. No. 11/890,194; Final Rejection dated Dec. 16, 2015; 31 pages.

* cited by examiner

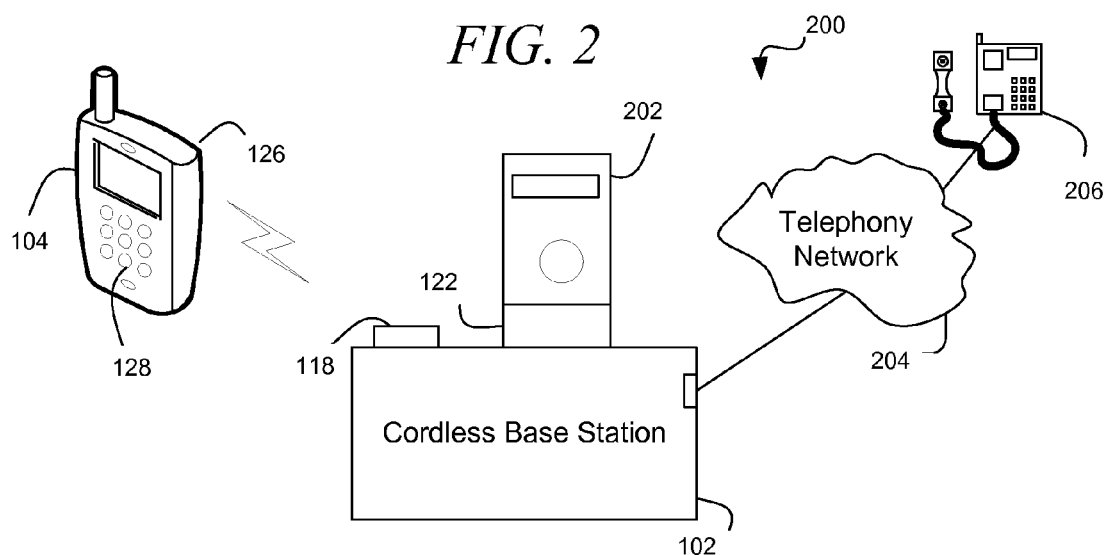
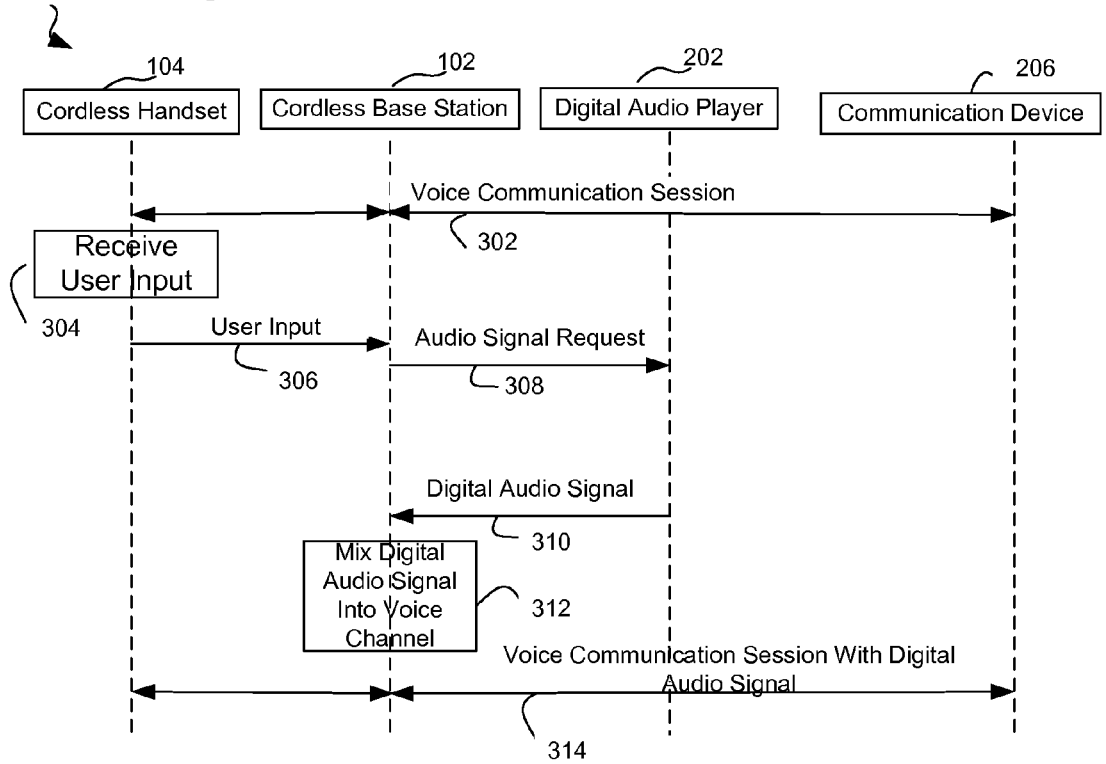

SYSTEM, METHOD AND APPARATUS FOR TRANSMITTING AUDIO SIGNALS OVER A VOICE CHANNEL

BACKGROUND

Music-on-hold (MOH) telecommunication systems allow businesses to play background music to fill the silence that would otherwise be heard by telephone callers that have been placed on hold. Music-on-hold is especially common in situations involving customer service. Some uses of music-on-hold include assuring the caller that their call is important and will be answered as soon as possible, entertaining the caller while on hold, informing the caller of his place in a queue and the approximate length of time until his call will be taken, informing the caller about options to leave the on-hold system, such as pressing a key to leave a voicemail or to be transferred to a different department, etc. Typically, music-on-hold systems are integrated into a business's telephone system via an audio jack on the telephone equipment. In such systems, a music source is connected to the business telephone system and a music program is played to a caller when the caller is placed on hold.

BRIEF SUMMARY

An embodiment of a system for transmitting an audio signal over a voice channel of a voice communication session includes a base station. The base station includes an audio player docking station configured for coupling the base station with an audio player device, and at least one processor. The at least one processor is configured to establish a voice communication session between the base station and a communication device. The voice communication session has a voice channel for carrying voice data between the base station and the communication device. The at least one processor is further configured to receive a user input including a request for an audio signal from the audio player device and send the audio signal request to the audio player device. The at least one processor is further configured to receive the requested audio signal from the audio player device, and mix the audio signal into the voice channel of the voice communication session.

Another embodiment of a system for transmitting an audio signal over a voice channel of a voice communication session includes a content data store configured for storing at least one audio signal, and a server in communication with the content data store over a network. The server is configured to establish a voice communication session between a first communication device and a second communication device. The voice communication session has a voice channel for carrying voice data between the first communication device and the second communication device. The server is further configured to receive a user input including a request for the at least one audio signal from the content data store, and send the audio signal request to the content data store. The server is further configured to receive the requested audio signal from the content data store, and mix the audio signal into the voice channel of the voice communication session.

An embodiment of a method for transmitting an audio signal over a voice channel of a voice communication session includes establishing a voice communication session between a first communication device and a second communication device. The voice communication session has a voice channel for carrying voice data between the first communication device and the second communication device. The method further includes receiving a user input at a server. The user input includes a request for at least one audio signal from a content data store. The method further includes sending, from the server, the audio signal request to the content data store, and receiving, at the server, the requested audio signal from the content data store. The method further includes mixing, by the server, the audio signal into the voice channel of the voice communication session.

BRIEF DESCRIPTION OF THE DRAWINGS

Illustrative embodiments of the present invention are described in detail below with reference to the attached drawing figures, which are incorporated by reference herein and wherein:

FIG. 2 is an embodiment of a system for transmitting an audio signal over a voice channel of a voice communication session including the cordless telephone system of FIG. 1;

FIG. 3 is an embodiment of a procedure for transmitting an audio signal over a voice channel of a voice communication session using the system 200 of FIG. 2;

DETAILED DESCRIPTION

Various embodiments allow a user to initiate the transmitting of an audio signal over a voice channel in a voice communication session, such as a telephone conversation, so that the audio signal may be heard by each participant of the voice communication session. The audio signal may include music, a recorded sound, or any other audio signal. In a particular embodiment, the audio signal is mixed into the voice channel as background audio. In at least one embodiment, the audio signal is mixed into the voice channel by a cordless or corded base station at a customer premise location. In one or more embodiments, the audio signal is received by the base station from an audio player device, such as an MP3 player or iPod, coupled to the base station via an audio player docking station on the base station. In still other embodiments, the audio signal is received by the base station from a server in communication with the base station over a network, such as a local area network (LAN) or the internet. In particular embodiments, the user may create, store, and retrieve music or other sounds from the server for introduction into the voice channel. In some embodiments, the user may activate the desired audio signal or initiate the playing of a playlist, including one or more audio signals by entering an assigned code sequence associated with the audio signal or playlist from a handset keypad or base station keypad.

In alternative embodiments, the audio signal is mixed into the voice channel by a network server within a network providing a network-based system for allowing a user to store, retrieve, and initiate playing of music, sounds, or other audio signals during a voice communication session. For example, a user may upload, download, create, and manage music or sounds as individual pieces and/or develop a series of music or sounds in a play list that may be played either randomly or sequentially. In at least one embodiment, the user may initiate playing of the desired music/sound or playlist by entering an assigned code sequence associated with the music/sound or playlist from a handset keypad or base station keypad. In various embodiments, the user may control the playing of the audio signal during the voice communication session by entering a control input. In at least one embodiment, the control input includes an assigned code sequence associated with a particular control function. In various embodiments, the control function may include selecting a particular audio signal, starting and stopping the playing of the audio signal, and/or adjusting the volume of the audio signal. Various embodiments allow a user to personalize a voice communication session with selected background music and/or sounds to increase the "fun factor" of voice telecommunications.

Figure 1:
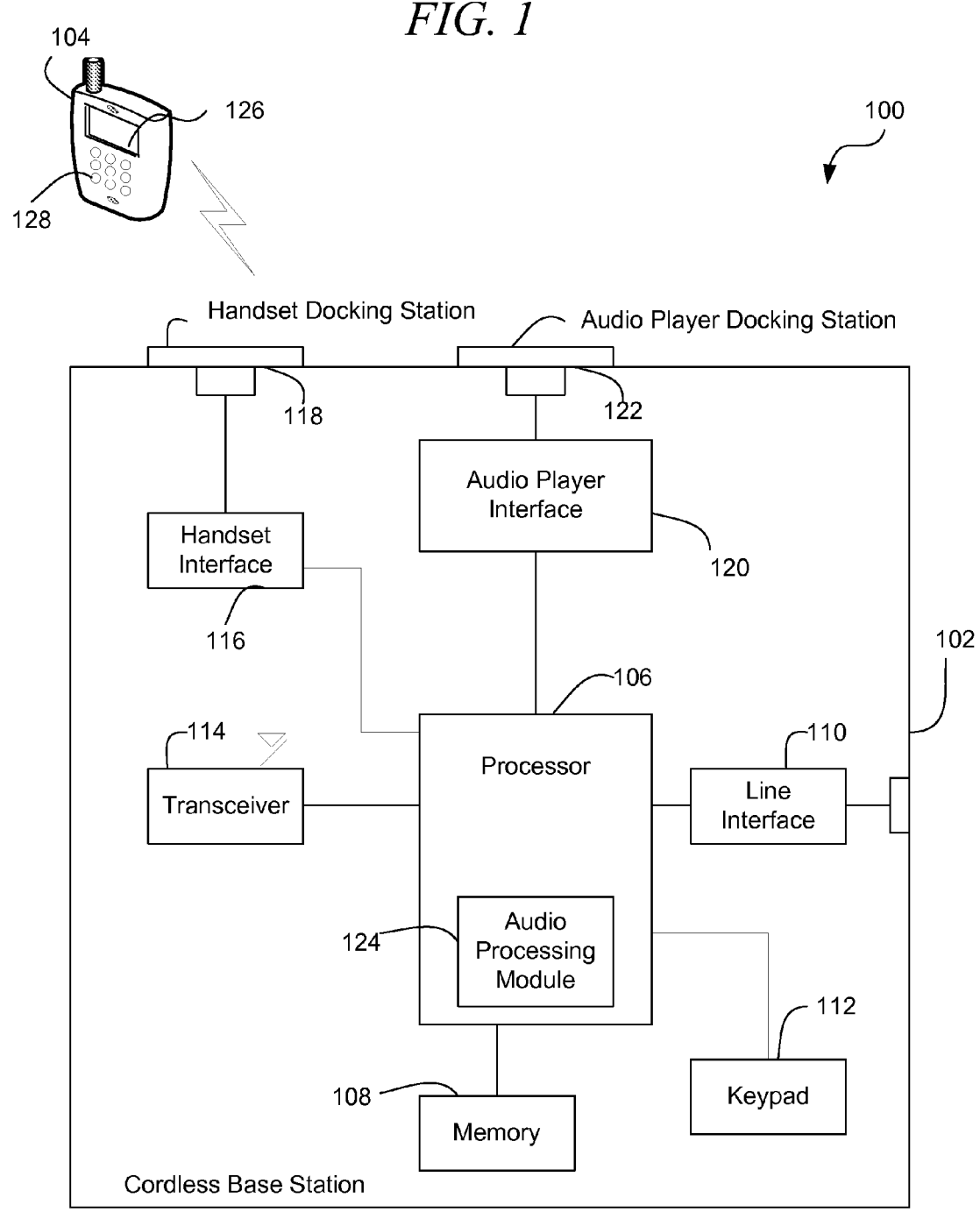
FIG. 1 is an embodiment of a cordless telephone system for transmitting an audio signal over a voice channel of a voice communication session.

FIG. 1 is an embodiment of a cordless telephone system 100 for transmitting an audio signal over a voice channel of a voice communication session. The cordless telephone system 100 includes a cordless base station 102 and a cordless handset 104 located at a customer premise location, such as at a home or a business. The cordless base station 102 includes processor 106, memory 108, line interface 110, base station keypad 112, transceiver 114, handset interface 116, handset docking station 118, audio player interface 120, and audio player docking station 122. The processor 106 is in communication with each of the memory 108, line interface 110, base station keypad 112, transceiver 114, handset interface 116, handset docking station 118, audio player interface 120, and audio player docking station 122. The line interface 110 is configured to couple the cordless base station 102 to a telephone network. In one embodiment, the telephone network is a public switched telephone network (PSTN). In another embodiment, the telephone network is an Internet Protocol (IP) network. The processor 106 is configured to retrieve computer readable instructions from the memory 108 and execute the computer readable instructions to perform various functions of the cordless base station 102 described herein.

The base station key pad 112 is configured to receive user input to, for example, dial a number, retrieve a list of incoming and/or outgoing phone calls, or send a request to the processor 106 of cordless base station 102. The transceiver 114 is configured to transmit and receive radio signals, such as voice data of an established voice session, with the cordless handset 104. The handset interface 116 is configured to electrically couple the handset docking station 118 to the processor 106. The handset docking station 118 is configured to allow the cordless handset 104 to be removably coupled to the cordless base station 102 and provide an electrical connection between the handset 104 and the handset interface 116. In a particular embodiment, coupling the handset 104 to the cordless base station 102 allows the cordless base station 102 to charge a battery within the cordless handset 104. The audio player interface 120 is configured to electrically couple the processor 106 to the audio player docking station 122. The audio player docking station 122 is configured to electrically and physically couple an audio source, such as a portable digital music player device, to the cordless base station 102. The processor 106 further includes an audio processing module 124. The audio processing module 124 is configured to mix one or more audio signals into a voice channel of a voice communication session. The cordless handset 104 includes a handset display 126 and a handset keypad 128. The handset display 126 is configured to display status information to a user of the cordless handset 104, such as caller ID information or an on-hook/off-hook status of the cordless handset 104. The handset keypad 128 is configured to receive an input from the user to, for example, dial a number, retrieve a list of incoming and/or outgoing phone calls, or send a request to the processor 106 of cordless base station 102.

FIG. 2 is an embodiment of a system 200 for transmitting an audio signal over a voice channel of a voice communication session including the cordless telephone system 100 of FIG. 1. In the system 200 of FIG. 2, a digital audio player device 202 is coupled to the audio player docking station 122 of the cordless base station 102. The digital audio player device 202 stores one or more digital audio signals, such as music and/or sounds. In one or more embodiments, the digital audio player device 202 stores the one or more digital audio signals in one or more digital audio files. In at least one embodiment, the digital audio player device 202 is a portable MP3 player. In a particular embodiment, the digital audio player device 202 stores each of the one or more digital audio signals in an MP3 file. In still other embodiments, any digital or analog audio source may be coupled to the audio player docking station 122. The line interface 110 of the cordless base station 102 is coupled to a telephony network 204. In one embodiment, the telephony network 204 is a PSTN. In another embodiment, the telephone network 204 is an IP network. A communication device 206 is in communication with the telephony network 204. In a particular embodiment, the communication device 206 is a telephone.

In at least one embodiment, a voice communication session is established between the cordless handset 104 and the communication device 206 through the cordless base station 102 and the telephony network 204. The voice communication session includes at least one voice channel for carrying voice data between the cordless handset 104 and the communication device 206. The voice channel carries voice data allowing for a voice conversation between a user of the cordless handset 104 and a participant using communication device 206. During the voice communication session, the user of the cordless handset 104 may press a particular key or an assigned code sequence associated with a particular digital audio signal or playlist on the handset keypad 128, and an indication of the key press or code sequence is sent to the cordless base station 102. In response to the user input, the cordless base station 102 sends a request for the particular digital audio signal or the particular playlist to the digital audio player device 202. In response to receiving the request, the digital audio player device 202 sends the requested digital audio signal or a digital audio signal associated with the requested playlist to the processor 106 of the cordless base station 102. The audio processing module 124 of the processor 106 mixes the digital audio signal from the digital audio player device 202 into the voice channel of the voice communication session. As a result, the digital audio signal is played in the background of the telephone conversation. In various embodiments, the system 200 allows a user of the cordless handset 104 to introduce audio signals such as music and/or other sounds into the voice channel during a voice conversation. In a particular embodiment, a user is able to create and manage the music or other sounds in the form of a playlist in which the individual audio signals of the playlist are executed in either a random or sequential order during the telephone conversation. In some embodiments, the user of the cordless handset 104 is able to select one or more playlists, start or stop the music or sound, and control or adjust the volume of the music or sound to a desired listening level during the voice communication with the other party by entering a control input. In at least one embodiment, the control input includes an assigned code sequence associated with a particular control function. In various embodiments, the control may include choosing a particular audio signal, starting and stopping the playing of the audio signal, skip to a next song in a playlist, replay a particular song, and/or adjusting the volume of the audio signal.

In some embodiments, the user may configure one or more playlists, each executed by a different key press or sequence of key presses of the handset keypad 128. Examples of music and/or sounds that may be included in a playlist include a playlist #1 which includes soft jazz music, a playlist #2 which includes sounds of the ocean, such as waves and seagulls, and a playlist #3 which includes music or a sound track from a business's television or radio commercial. Still other examples of playlists include a playlist #4 which includes sounds sampled from a rodeo or cattle drive to be played as a joke during a business call with colleagues. A play list #5 may include music from the user's garage band that he or she may want to promote to callers. A playlist #6 may include a special piece of music or meaningful song to be played during a conversation with a loved one or significant other.

In another embodiment, the audio processing module 124 may include a rules-based engine for determining a particular audio signal or an audio signal of a particular playlist to be mixed into the voice communication session based upon detecting the occurrence of one or more pre-assigned triggering conditions. In one embodiment, a rule may be created that associates a particular audio signal or playlist to be played based upon an indication of the user's mood, such as whether the user is happy, sad, etc.). Upon receiving a user input from the user indicating the caller's mood, the audio processing module 124 will use the rule to determine a particular song or particular playlist to mix into the voice communication session based upon the mood indication. For example, the audio processing module 124 may choose a sad song or a song from a playlist of sad songs if the caller indicates that he or she is in a sad mood.

In another embodiment, a time of day rule may be created by the user in which a particular audio signal or playlist list is associated with a particular time of day. For example, the user may associate a particular audio signal or playlist with a "morning" time of day, another audio signal or playlist with an "afternoon" time of day, and still another audio signal or playlist with an "evening" time of day. If a voice communication session is established and the time of day rule is active, the audio processing module 124 will mix a particular audio signal or audio signal from a particular playlist associated with the time of day into the voice channel of the voice communication session. In another embodiment, a rule based upon the day of the week may be used to associated a particular song or playlist with a day of the week. For example, the user may wish to associate an upbeat song with Fridays. When a voice communication session is established and the day of the week rule is active, the audio processing module 124 will determine the current day of the week and mix the audio signal or audio signal from a playlist associated with the current day of the week into the voice channel of the voice communication session. In still another embodiment, a rule based upon the day of the year may be created in which a particular audio signal or playlist is associated with a day of the year. In one embodiment, the user may wish to associate a particular song or playlist with a particular holiday. For example, the user may wish to associate a Christmas song or playlist with Christmas Day, or a scary song or playlist with Halloween. When a voice communication session is established and the day of the year rule is active, the audio processing module 124 will determine the current day of the year and mix the audio signal or audio signal from a playlist associated with the current day of the year into the voice channel of the voice communication session.

In another embodiment, a user may create a rule associating the identity of the called party with a particular audio signal or playlist. The caller identity may be based, for example, upon Caller ID information, frequently called party information, or a network address book entry of the called party. If a voice communication session is established with the called party and the caller identity rule is active, the audio processing module 124 mixes the particular audio signal or audio signal from the particular playlist associated with the called party into the voice channel of the voice communication session. In still another embodiment, a rule may be created in which a particular audio signal or playlist is associated with a particular country. If a voice communication session is established will a called party located in that particular country, the audio processing module 124 mixes the particular audio signal or audio signal from a particular playlist associated with the country into the voice channel of the voice communication session.

In another embodiment, the audio processing module 124 is configured to associate particular words or phrases in a conversation with a particular audio signal or playlist. The audio processing module 124 is further configured to detect if a participant in a voice communication session has uttered the particular word or phrase, and mix the audio signal associated with the particular word or phrase into the voice channel of the voice communication session of the particular word or phrase is detected. For example, if the word "rain" is uttered during a phone conversation, the audio processing module 124 may be configured to mix a song about rain into the voice channel. In another example, if a participant in a phone conversation utters the word "hello", the audio processing module 124 may mix an audio signal including the word "hello" spoken in several different languages. In still another embodiment, the audio processing module 124 may be configured to mix an audio signal announcing a particular time of day into the voice channel of a voice communication session if the particular time of day occurs during the voice communication session. For example, the audio processing module 124 may mix an audio signal announcing "one o'clock" when the time of day is one o'clock during a phone conversation.

FIG. 3 is an embodiment of a procedure 300 for transmitting an audio signal over a voice channel of a voice communication session using the system 200 of FIG. 2. In step 302, a voice communication session is established between the cordless handset 104 and the communication device 206 via the cordless base station 102. The voice communication session includes at least one voice channel used to exchange voice data between the cordless handset 104 and the communication device 206. In one embodiment, the voice communication session is established by the user of the cordless handset 104 placing a call to the communication device 206. In another embodiment, the voice communication session is established by a caller of the communication device 206 placing a call to the cordless handset 104. After establishment of the voice communication session, the user of the cordless handset 104 and the caller of the communication device 206 may carry on a telephone conversation over the voice channel. In step 304, the cordless handset 104 receives a user input via the handset keypad 128. The user input serves as a request for receiving a particular song or other audio signal from the digital audio player device 202. In an alternative embodiment, the user input may be received via a touch screen on the handset display 126. In step 306, the user input is sent to the cordless base station 102 by the cordless handset 104. In response to receiving the user input, the cordless base station 102 sends an audio signal request to the digital audio player device 202 via the audio player interface 120 in step 308. The audio signal request is a request for the digital audio player device 202 to send the particular song or other audio signal, or alternatively a request to play an digital audio signal from a playlist to the digital audio player device 202. In step 310, the digital audio player device 202 sends the requested digital audio signal to the processor 106 of the cordless base station 102. In an alternative embodiment, the digital audio player device 202 may send the audio signal to the processor 106 in as an analog audio signal and the processor 106 or audio processing module 106 may convert the analog audio signal into a digital audio signal. In step 312, the audio processing module 106 of the cordless base station 102 mixes the digital audio signal into the voice channel of the voice communication session. In at least one embodiment, by mixing the digital audio signal into the voice channel, both the user of the cordless handset 104 and the participant using communication device 206 may listen to the digital audio signal as background audio during the voice communication session. Accordingly, in step 314 the voice channel of the voice communication session includes the digital audio signal, as well as the voice data between the cordless handset 104 and the communication device 206. In an alternative embodiment, the cordless base station 102 may send the audio signal request to the digital audio player device 202 in response to receiving caller ID information from the communication device 206 so that a particular audio signal or playlist is played in response to receiving a call from a particular caller. In another embodiment, the cordless base station 102 may send the audio signal request to the digital audio player device 202 in response to the user initiating a call to a particular phone number.

Figure 4:
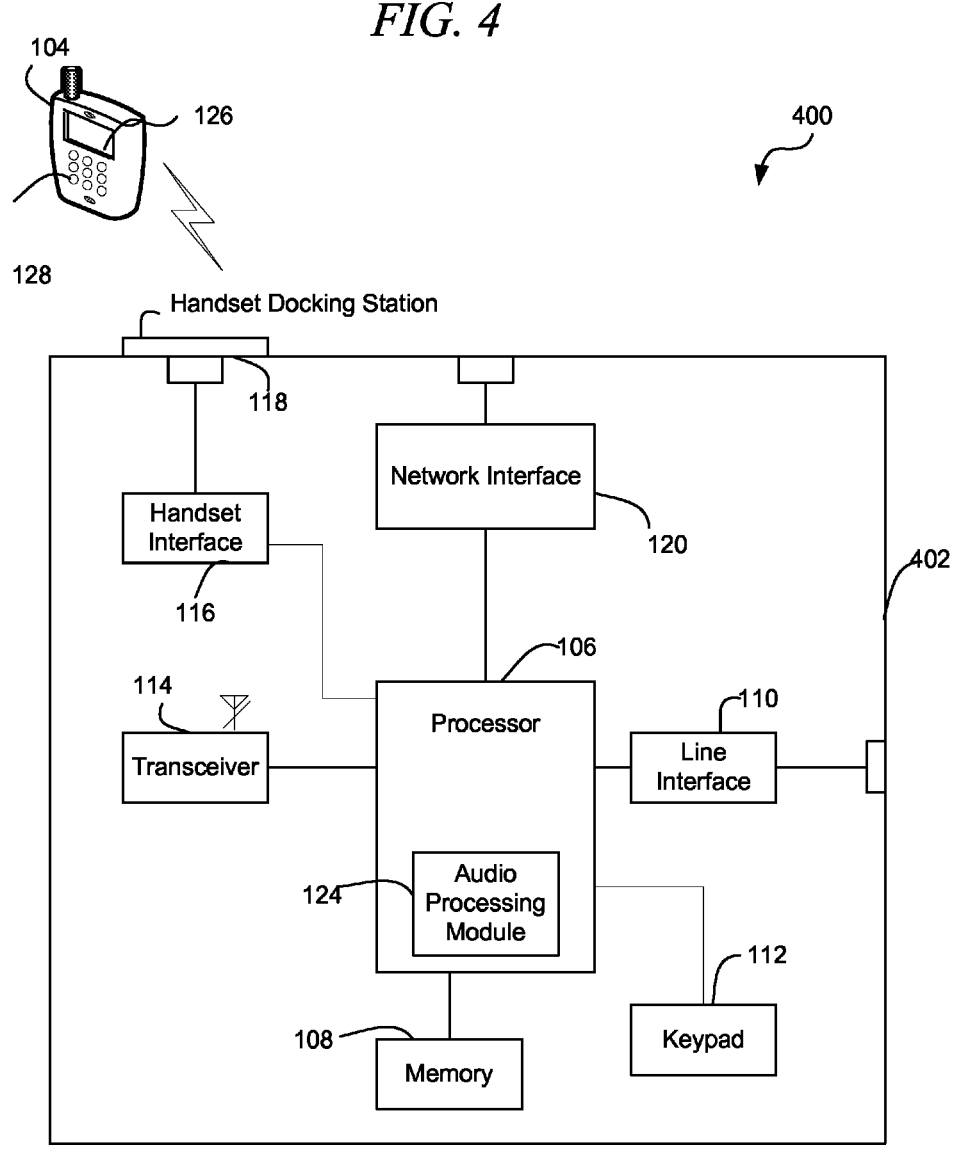
FIG. 4 is another embodiment of a cordless telephone system for transmitting an audio signal over a voice channel of a voice communication session.

FIG. 4 is another embodiment of a cordless telephone system 400 for transmitting an audio signal over a voice channel of a voice communication session. The system 400 includes a cordless base station 402 and a cordless handset 104 located at a customer premise location. The cordless base station 402 includes the processor 106, memory 108, line interface 110, keypad 112, transceiver 114, handset interface 116, handset docking station 118, and audio processing module 124, as described with respect to FIG. 1. The network interface 404 is configured to couple the cordless base station 402 to a packet-based network, such as a local area network (LAN) or the Internet. In various embodiments, the network interface 404 is configured to receive a digital audio signal from the packet-based network and provide the digital audio signal to the processor 106. In a particular embodiment, the digital audio signal is received by the network interface as a digital audio stream. The audio processing module 124 of the processor 106 is configured to mix the digital audio signal into a voice channel of an established voice communication session in a similar manner as the cordless telephone system described with respect to FIG. 1.

Figure 5:
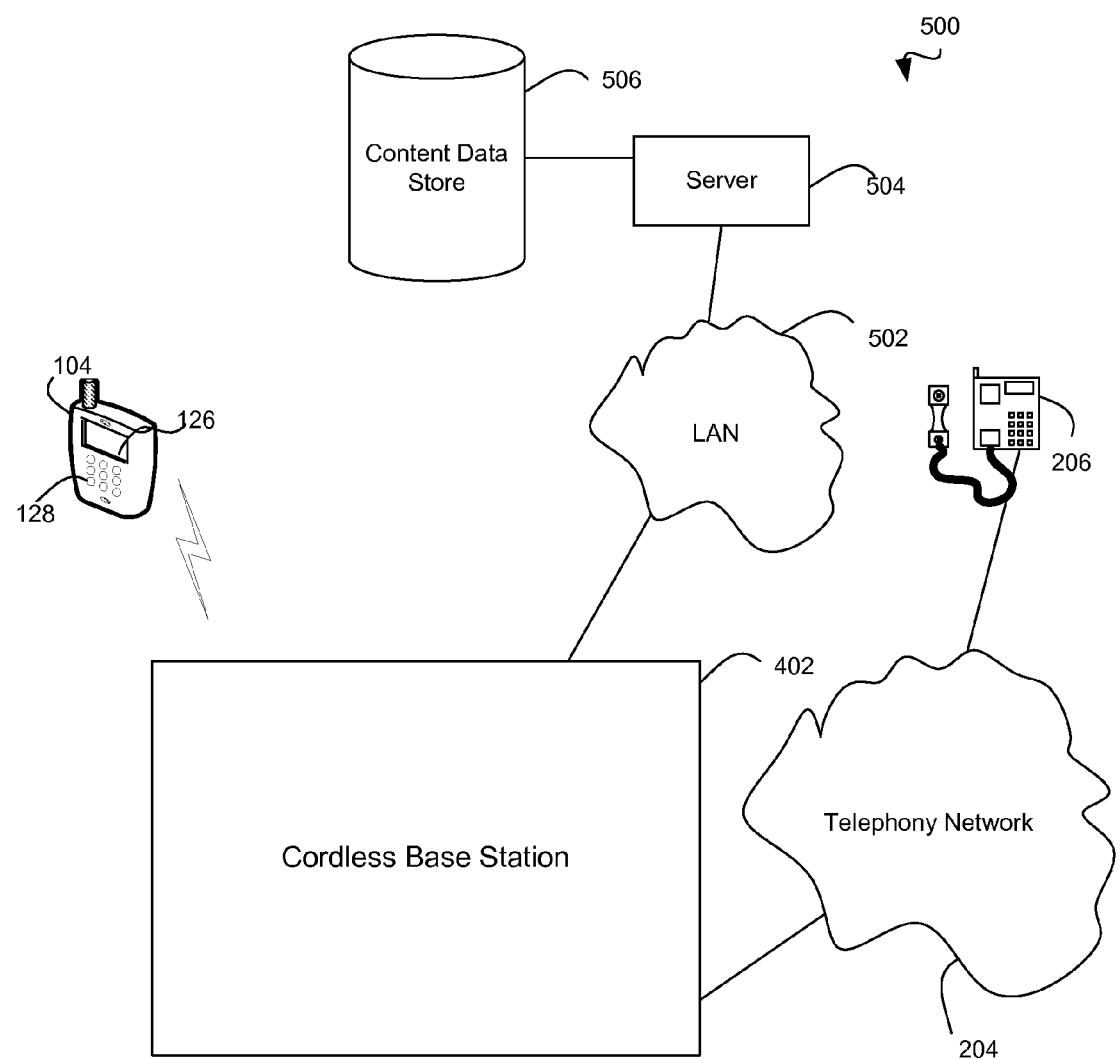
FIG. 5 is another embodiment of a system for transmitting an audio signal over a voice channel of a voice communications session using the cordless telephone system of FIG. 4.

FIG. 5 is an embodiment of a system 500 for transmitting an audio signal over a voice channel of a voice communications session including the cordless telephone system 400 of FIG. 4. In the system 500 of FIG. 5, the network interface 404 of the cordless base station 402 is in communication with a LAN 502. System 500 further includes a server 504 in communication with the LAN 502. In a particular embodiment, the server 504 is a personal computer. The server 504 is in further communication with a content data store 506. The content data store 506 is configured to store one or more digital audio files, such as music or other audio, and/or one or more playlists. In at least one embodiment, the content data store 506 includes one or more storage devices, such as a hard drive or memory. In at least one embodiment, a voice communication session is established between the cordless handset 104 and the communication device 206. The voice communication session includes at least one voice channel for carrying voice data between the cordless handset 104 and the communication device 206. After establishment of the communication session, the user of the cordless handset 104 may initiate a request to play a particular digital audio signal or file or group of digital audio signals or files during the telephone conversation. In a particular embodiment, the user initiates the request by pressing an assigned key or assigned key sequence associated with the digital audio signal or playlist on the handset keypad 128. The cordless base station 402 receives the user input including the assigned key sequence associated with the audio signal and sends an audio signal request to the server 504 via the LAN 502.

In response to receiving the audio signal request, the server 504 retrieves the particular audio signal from the content data store 506 and sends the particular audio signal to the cordless base station 402 via the LAN 502. The audio processing module 124 of the cordless base station 402 then mixes the digital audio signal into the voice channel so that the user of the cordless handset 104 and the user of the communication device 206 may listen to the digital audio signal as background audio during the telephone conversation. In some embodiments, the user of the cordless handset 104 may further control the server 504 by sending a request to the server 504 to start or stop the playing of the digital audio signal and/or to change to the playing of a different digital audio signal. In still other embodiments, the user of cordless handset 104 may send a request to the cordless base station 402 to control the volume of the digital audio signal. In various embodiments, the user may control the playing of the audio signal during the voice communication session by entering a control input using the cordless handset 104. In at least one embodiment, the control input includes an assigned code sequence associated with a particular control function. In various embodiments, the control may include selecting a particular audio signal, starting and stopping the playing of the audio signal, and/or adjusting the volume of the audio signal.

In another embodiment, the audio processing module 124 may be configured to mix in audio of a scheduled sports game during a voice communication session by scheduling the playing of the audio of the sports game in advance of the voice communication session. In an alternative embodiment, the audio of the scheduled sports game may be automatically mixed into the voice communication session if the user happens to be watching the sports game at the time the call was made. In a particular embodiment, the audio of the sports game may be received from a server in communication with the LAN 502, such as server 504. In an alternative embodiment, the audio of the sports game may be received from a set-top box located at the customer premise location.

Figure 6:
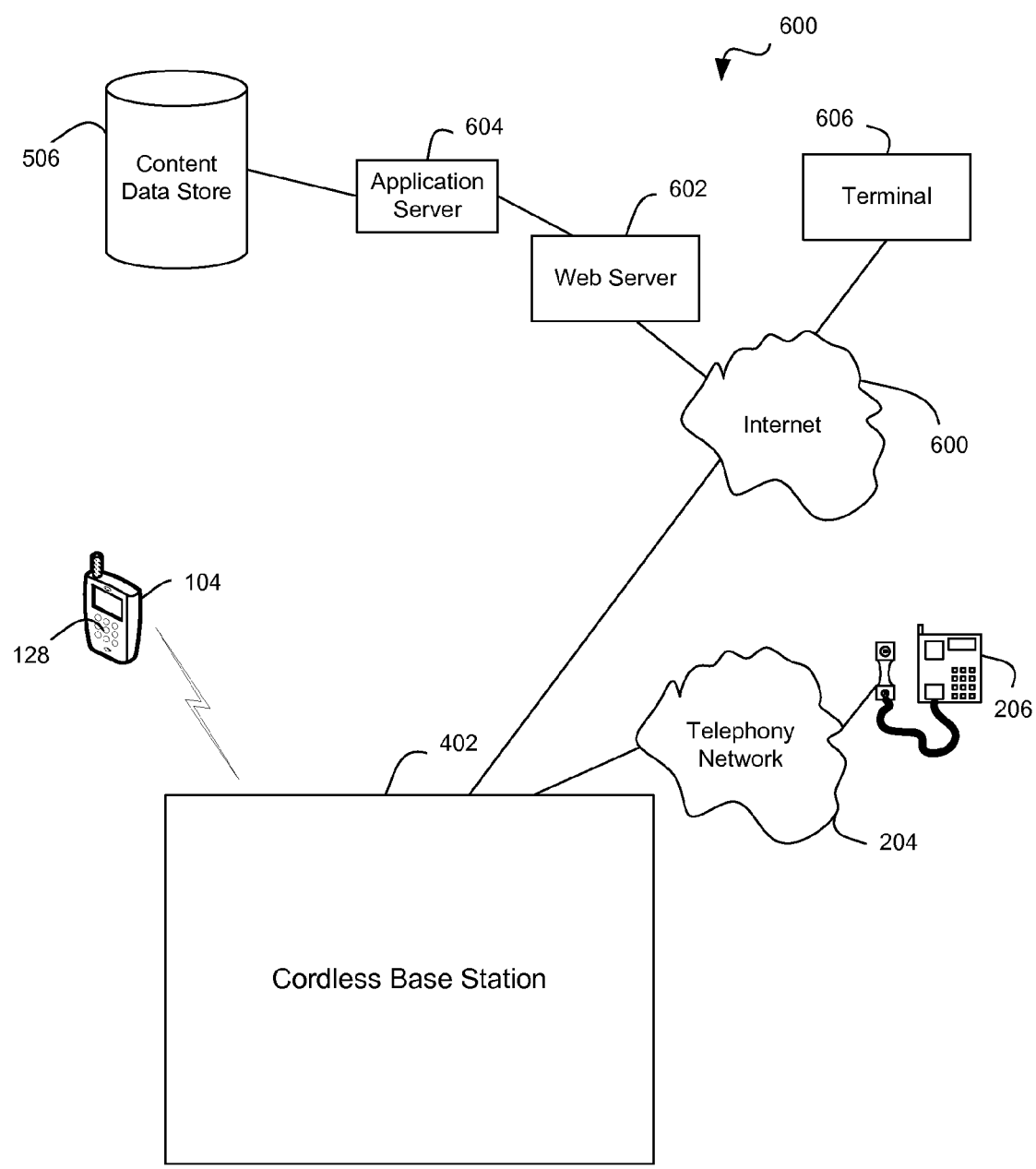
FIG. 6 is another embodiment of a system for transmitting an audio signal over a voice channel of a voice communication session using the cordless telephone system of FIG. 4.

FIG. 6 is another embodiment of a system 600 for transmitting an audio signal over a voice channel of a voice communication session using the cordless telephone system 400 of FIG. 4. In the embodiment illustrated in FIG. 6, the network interface 404 of the cordless base station 402 is in communication with the Internet 600. The system 600 further includes a web server 602 in communication with the Internet 600 and an application server 604 in communication with the web server 602. The application server 604 is in further communication with a content data store 506. The content data store 506 is configured to store one or more digital audio files and/or playlists. The system 600 further includes a terminal 606 which is configured to allow a user to access the web server 602 to configure the operation of application server 604. In a particular embodiment, a user may access the web server 602 using the terminal 606 to configure the application server 604 to access particular digital audio files from the content data store 506 in response to a request from a user of the cordless handset 104, upload one or more digital audio files to the content data store 506, create one or more playlists, and perform other management functions of the application server 604. In a particular embodiment, the terminal 606 is a personal computer. In still other embodiments, the terminal 606 is a mobile telephone. In an alternative embodiment, the user may configure the application server 604 using the cordless handset 104.

In at least one embodiment, a voice communication session is established between the cordless handset 204, the communication device 206 including at least one voice channel. Upon receiving user input from the cordless handset 104, the cordless base station 402 sends a request for a particular digital audio file or playlist to the application server 604 via the Internet 600. In response to receiving the request, the application server 604 retrieves the particular digital audio file or a digital audio file associated with a playlist from the content data store 506, and sends the digital audio file to the cordless base station 402 as a streaming digital audio signal. The cordless base station 402 mixes the streaming digital audio signal into the voice channel of the voice communication session such that the user of the cordless handset 104 and a participant using the communication device 206 may listen to the digital audio signal as background of the voice communication session. In still other embodiments, the user of the cordless handset 104 may increase the volume, stop or start the digital audio signal or change to a different digital audio file using a user input from the handset keypad 128 of the cordless handset 104 or the base station keypad 112.

In another embodiment, the audio processing module 124 may be configured to mix in audio of a scheduled sports game during a voice communication session by scheduling the playing of the audio of the sports game in advance of the voice communication session. In an alternative embodiment, the audio of the scheduled sports game may be automatically mixed into the voice communication session if the user happens to be watching the sports game at the time the call was made. In a particular embodiment, the audio of the sports game may be received from a server in communication with the Internet 600, such as application server 604.

Figure 7:
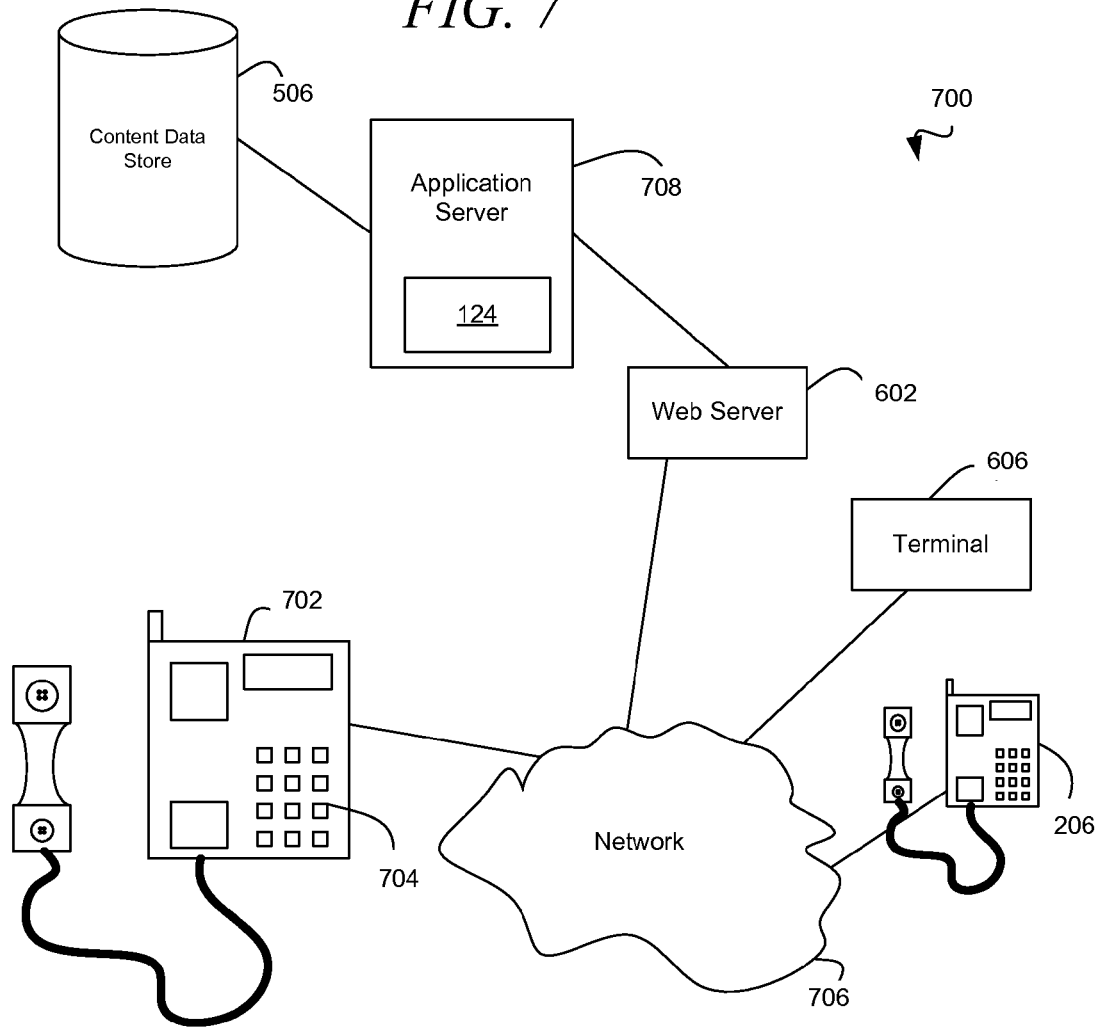
FIG. 7 is another embodiment of a system for transmitting an audio signal over a voice channel of a voice communication session.

FIG. 7 is another embodiment of a system 700 for transmitting an audio signal over a voice channel of a voice communication session. The system 700 provides a network-based system for allowing a user to store, retrieve, and initiate playing of music, sounds, or other audio signals during a voice communication session. The system 700 includes a telephony device 702 having a telephony device keypad 704. In one embodiment, the telephony device 702 is an IP phone. In another embodiment, the telephony device 702 is a PSTN phone. In still other embodiments, the telephony device 702 may include any communication device. The telephony device 702 is in communication with network 706. In one embodiment, network 706 is an IP network. In another embodiment, network 706 is a PSTN. The network 700 further includes a web server 602 in communication with the network 706, and an application server 708 in communication with the web server 602. The application server 708 includes an audio processing module 124 configured to mix a digital audio signal into a voice channel of an established voice communication session. The system 700 further includes a content data store 506 in communication with the application server 708. A terminal 606 and a communication device 206 are in communication with the network 706. The terminal 606 is configured to allow a user to access the web server 602 to configure the operation of application server 708.

In one embodiment, a voice communication session is established between the telephony device 702 and the communication device 206 by the application server 708. The voice communication session includes one or more voice channels for carrying call data between the telephony device 702 and the communication device 206. In at least one embodiment, the application server is a voice over IP (VoIP) server. In at least one embodiment, the user of the telephony device 702 presses an assigned key or sequence of keys associated with a particular digital music signal or playlist on the keypad 704, and in response the telephony device 702 sends an audio signal request to the application server 708. The audio signal request indicates the particular digital music file or playlist stored on the content data store 506 that is requested to be played during the voice communication session. In response to receiving the request, the application server 708 retrieves the requested digital audio file or signal from the content data store 506, and the audio processing module 124 mixes the digital audio signal into the voice channel of the voice communication session. The terminal 606 allows a user to access the web server to configure the application server so that the user can upload or download music or sounds, create and manage the music or sounds as individual pieces of music or sounds, or develop a series of music or sounds in the form of one or more playlists. The user may also assign a code sequence to be entered from the keypad 704 that is intended to activate a particular music/sound or playlist.

In another embodiment, both the user of the telephony device 702 and the user of the communication device 206 may be provided with the capability of mixing audio signals into a voice channel of an established voice communication session. In such an embodiment, the audio processing module 124 may alternate between playing audio signals from the telephony device 702 user's playlist and the communication device 206 user's playlist. In at least one embodiment, both the user of the user of the telephony device 702 and the user of the communication device 206 may be provided with the capability of controlling the playing of the current playlist, such as skipping to the next song.

In another embodiment, the audio processing module 124 may be configured to mix in audio of a scheduled sports game during a voice communication session by scheduling the playing of the audio of the sports game in advance of the voice communication session. In an alternative embodiment, the audio of the scheduled sports game may be automatically mixed into the voice communication session if the user happens to be watching the sports game at the time the call was made. In a particular embodiment, the audio of the sports game may be received from a server in communication with the network 706, such as application server 708.

Figure 8:
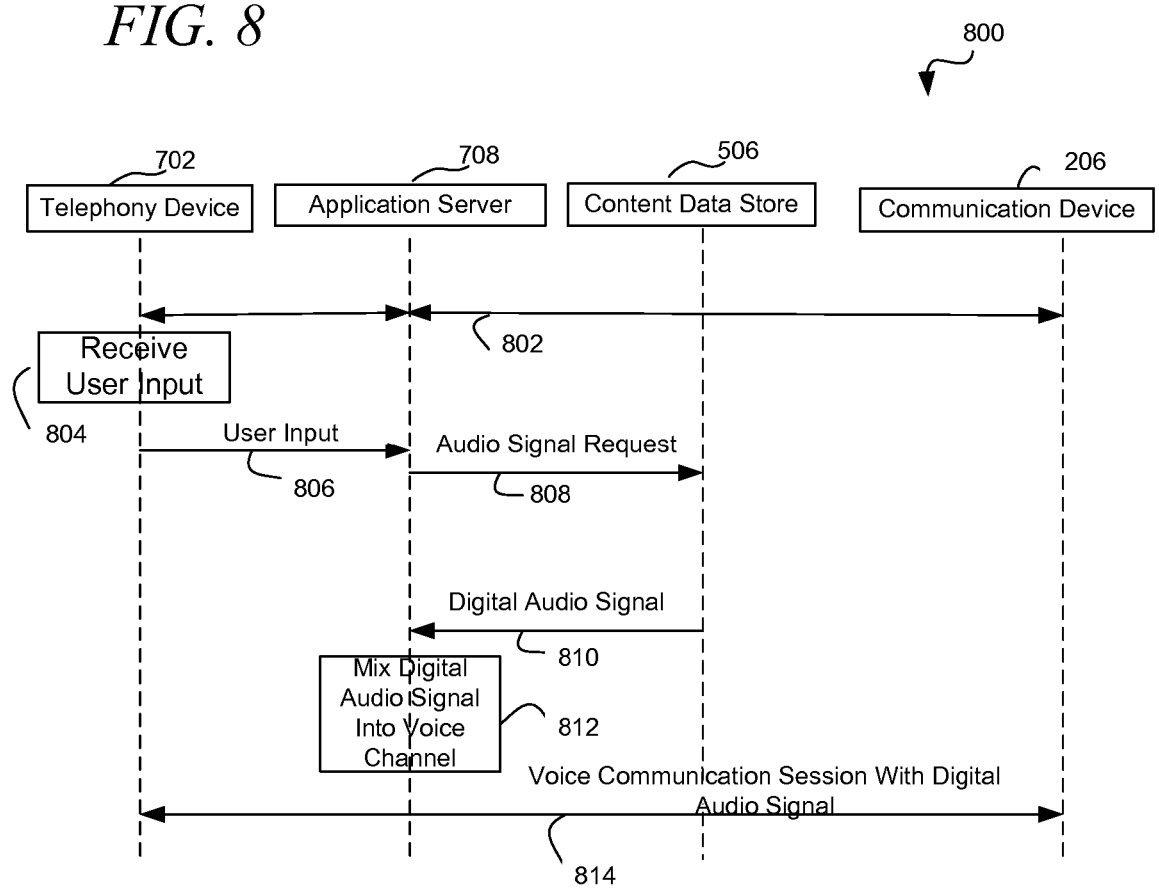
FIG. 8 is another embodiment of a procedure for transmitting an audio signal over a voice channel of a voice communication session using the system of FIG. 7.

FIG. 8 is another embodiment of a procedure 800 for transmitting an audio signal over a voice channel of a voice communication session using the system of FIG. 7. In step 802, a voice communication session is established between the telephony device 702 and the communication device 206 by the application server 708. The voice communication session includes at least one voice channel used to exchange voice data between the telephony device 702 and the communication device 206. In one embodiment, the voice communication session is established by the user of the telephony device 702 placing a call to a communication device 206. In another embodiment, the voice communication session is established by the user of the communication device 206 placing a call to the telephony device 702. After establishment of the voice communication session, the user of the telephony device 702 and the participant using the communication device 206 may carry on a telephone conversation over the voice channel. In step 804, the telephony device 702 receives a user input via the telephony device keypad 704. The user input serves as a request for receiving a particular song or other audio signal from the content data store 506. In step 806, the user input is sent to the application server 708. In response to receiving the user input, the application server sends an audio signal request to the content data store 506 in step 808. The audio signal request is a request for the content data store 506 to send a particular song or other audio signal, or a particular audio signal from a playlist to the application server 708. In step 810, the content data store 506 sends the requested digital audio signal to the application server 708. In step 812, the application server mixes the digital audio signal into the voice channel of the voice communication session. By mixing the digital audio signal into the voice channel, both the user of the telephony device 702 and the participant using the communication device 206 may listen to the digital audio signal, as background audio during the telephone conversation. Accordingly, in step 814 the voice channel of the voice communication session includes the digital audio signal as well as the voice data transmitted between the telephony device 702 and the communication device 206. In various embodiments, the user may control the playing of the audio signal during the voice communication session by entering a control input. In at least one embodiment, the control input includes an assigned code sequence associated with a particular control function. In various embodiments, the control function may include selecting a particular audio signal, starting and stopping the playing of the audio signal, and/or adjusting the volume of the audio signal.

Various embodiments provide for the ability to personalize voice communication by allowing the user to select desired music or sounds to enhance the communication experience. In some embodiments, the sound quality of the music or sounds are enhanced by reducing distortion and/or improving clarity by correctly introducing the music or sound into the voice channel. Various embodiments provide the user with the ability to play music or sounds during a voice conversation at controlled volume levels which may result in an enhanced communication experience. In some embodiments, the user is provided with the convenience of selecting and controlling the music or sound selection and volume levels from the user's handset. Although various embodiments have been described with respect to cordless base stations, it should be understood that in some embodiments a corded base station may be used. In addition, although various embodiments have been described using landline network communications, it should be understood that in some embodiments mobile network communications may be used.

The illustrative embodiments can take the form of an entirely hardware embodiment, an entirely software embodiment, or an embodiment containing both hardware and software elements. Furthermore, the illustrative embodiments can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device. In various embodiments, the cordless base station 102, cordless base station 402, server 504, applications server 604, and application server 708 may include one or more processors operable to execute computer executable instructions from a computer-usable or computer-readable medium to perform the various capabilities of the cordless base station 102, cordless base station 402, server 504, applications server 604, and application server 708 described herein.

The computer-usable or computer-readable medium can be an electronic, magnetic, optical, electromagnetic, infrared, or semiconductor system (or apparatus or device) or a propagation medium. Examples of a computer-readable medium includes a semiconductor or solid state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

Further, a computer storage medium may contain or store a computer-readable program code, such that when the computer-readable program code is executed on a computer, the execution of this computer-readable program code causes the computer to transmit another computer-readable program code over a communication link. This communication link may use a medium that is, for example, without limitation, physical, or wireless.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed as new and desired to be protected by Letters Patent of the United States is:

1. A system for transmitting an audio signal over a voice channel of a voice communication session comprising:
   a content data store configured for storing a plurality of audio signals organized into playlists; and
   a voice over Internet Protocol (VoIP) server in communication with the content data store over a network, the server configured to:
      establish a voice communication session between a first communication device and a second communication device, the server being separate from the first communication device and the second communication device, the voice communication session having a voice channel for carrying voice data between the first communication device and the second communication device;
      receive user input from a first user during a voice conversation between the first user and a second user over the voice channel, the user input including a request for audio content from the content data store;
      detect an occurrence of a pre-assigned triggering condition, the pre-assigned triggering condition corresponding to one or more words or phrases detected in the voice communication session;
      determine a particular audio signal based upon the occurrence of the pre-assigned triggering condition;
      send a request to the content data store for the particular audio signal;

receive the particular audio signal from the content data store; and mix the audio signal with the one or more words or phrases spoken in different languages into the voice channel of the voice communication session, to provide the audio signal as background audio to the voice conversation.

2. The system of claim 1, wherein the particular audio signal is a digital audio signal.

3. The system of claim 1, wherein the particular audio signal is an analog audio signal.

4. The system of claim 1, wherein the user input includes an assigned key sequence associated with requesting audio content from the content data store.

5. The system of claim 1, wherein the content data store is further configured to store at least one audio signal in at least one digital audio file.

6. The system of claim 1, wherein the VoIP server is further configured to receive a control input including an assigned code sequence associated with a particular control function.

7. The system of claim 6, wherein the control function includes at least one of starting the particular audio signal, stopping the particular audio signal, and adjusting a volume of the particular audio signal.

8. The system of claim 1, wherein the content data store is a video set-top box, and wherein the server receives audio from the set-top box corresponding to video programming the first user is watching during the voice conversation.

9. A method for transmitting an audio signal over a voice channel of a voice communication session comprising:

establishing, with a voice over Internet Protocol (VoIP) server, a voice communication session between a first communication device and a second communication device, the server being separate from the first communication device and the second communication device, the voice communication session having a voice channel for carrying voice data between the first communication device and the second communication device;

receiving user input at the VoIP server from a first user during a voice conversation between the first user and a second user over the voice channel, the user input including a request for audio content from a content data store;

detecting an occurrence of a pre-assigned triggering condition, the pre-assigned triggering condition corresponding to one or more words or phrases detected in the voice communication session;

determining a particular audio signal based upon the occurrence of the pre-assigned triggering condition;

sending, from the VoIP server, the request to the content data store for the particular audio signal;

receiving, at the VoIP server, the particular audio signal; and mixing, by the VoIP server, the particular audio signal with the one or more words or phrases spoken in different languages into the voice channel of the voice communication session, to provide the particular audio signal as background audio to the voice conversation.

10. The method of claim 9, wherein the user input includes an assigned key sequence associated with requesting audio content from the content data store.

11. The method of claim 9, wherein the particular audio signal is a digital audio signal.

12. The method of claim 9, wherein the particular audio signal is an analog audio signal.

13. The method of claim 9, wherein the content data store is further configured to store at least one audio signal in at least one digital audio file.

14. The method of claim 9, wherein the server is further configured to receive a control input including an assigned code sequence associated with a particular control function.

15. The method of claim 14, wherein the control function includes at least one of starting the particular audio signal, stopping the particular audio signal, and adjusting a volume of the particular audio signal.

16. The method of claim 9, wherein the content data store is a video set-top box, and wherein the server receives audio from the set-top box corresponding to video programming the first user is watching during the voice conversation.

* * * * *